(12) United States Patent  
Kent et al.

(10) Patent No.: US 7,505,539 B2  
(45) Date of Patent: Mar. 17, 2009

(54) METHOD AND SYSTEM FOR SINGLE ANTENNA RECEIVER SYSTEM FOR HSDPA

(75) Inventors: Mark Kent, Vista, CA (US); Vinko Erceg, Cardiff, CA (US); Uri M. Landau, San Diego, CA (US); Pieter Van Rooyen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 720 days.

(21) Appl. No.: 11/174,403

(22) Filed: Jun. 30, 2005

(65) Prior Publication Data

US 2006/0072652 A1 Apr. 6, 2006

Related U.S. Application Data

(60) Provisional application No. 60/616,419, filed on Oct. 6, 2004.

(51) Int. Cl.
*H04B 7/10* (2006.01)
*H04L 1/02* (2006.01)

(52) U.S. Cl. .................. 375/347; 375/349; 375/346; 375/148; 375/267; 455/504; 455/505; 455/506; 455/65

(58) Field of Classification Search ............... 375/267, 375/278, 285, 346, 347, 349, 350, 144, 148; 455/506, 504, 505, 65

See application file for complete search history.

(56) References Cited

U.S. PATENT DOCUMENTS

| 5,680,419 | A | * | 10/1997 | Bottomley | 375/347 |
| 6,128,355 | A | * | 10/2000 | Backman et al. | 375/347 |
| 7,269,238 | B2 | * | 9/2007 | Lee et al. | 375/346 |
| 2003/0139194 | A1 | * | 7/2003 | Onggosanusi et al. | 455/506 |
| 2005/0243898 | A1 | | 11/2005 | Reznik et al. | |
| 2006/0034352 | A1 | * | 2/2006 | Sampath et al. | 375/148 |

* cited by examiner

*Primary Examiner*—Phuong Phu
(74) *Attorney, Agent, or Firm*—McAndrews, Held & Malloy, Ltd.

(57) ABSTRACT

Aspects of a method and system for a single antenna receiver system for HSDPA are provided. Aspects of a method for processing RF signals, the method may comprise computing channel estimates based on a plurality of received individual distinct path signals, generating timing reference signals indicating a location of at least one of the plurality of received individual distinct path signals, combining at least a portion of the plurality of received individual distinct path signals as a signal cluster based on at least one of the computed channel estimates and said generated timing reference signals, and selecting at least one of combining and equalization processing based on at least one of the computed channel estimates and the generated timing reference signals. Aspects of a system for processing RF signals may comprise circuitry that selects at least one of combining and equalization processing based the computed channel estimates and/or generated timing reference signals.

22 Claims, 7 Drawing Sheets

METHOD AND SYSTEM FOR SINGLE ANTENNA RECEIVER SYSTEM FOR HSDPA

CROSS-REFERENCE TO RELATED APPLICATIONS/INCORPORATION BY REFERENCE

This application makes reference, claims priority to, and claims the benefit of United States Provisional Application Ser. No. 60/616,419 filed Oct. 6, 2004.

This application is related to the following applications, each of which is incorporated herein by reference in its entirety for all purposes:

U.S. patent application Ser. No. 11/173,870 filed Jun. 30, 2005;
U.S. patent application Ser. No. 11/174,303 filed Jun. 30, 2005;
U.S. patent application Ser. No. 11/173,502 filed Jun. 30, 2005;
U.S. patent application Ser. No. 11/173,871 filed Jun. 30, 2005;
U.S. patent application Ser. No. 11/173,964 filed Jun. 30, 2005;
U.S. patent application Ser. No. 11/173,252 filed Jun. 30, 2005;
U.S. patent application Ser. No. 11/174,252 filed Jun. 30, 2005;
U.S. patent application Ser. No. 11/172,756 filed Jun. 30, 2005;
U.S. patent application Ser. No. 11/173,305 filed Jun. 30, 2005;
U.S. patent application Ser. No. 11/172,759 filed Jun. 30, 2005;
U.S. patent application Ser. No. 11/173,689 filed Jun. 30, 2005;
U.S. patent application Ser. No. 11/173,304 filed Jun. 30, 2005;
U.S. patent application Ser. No. 11/173,129 filed Jun. 30, 2005;
U.S. patent application Ser. No. 11/172,779 filed Jun. 30, 2005;
U.S. patent application Ser. No. 11/172,702 filed Jun. 30, 2005;
U.S. patent application Ser. No. 11/173,727 filed Jun. 30, 2005;
U.S. patent application Ser. No. 11/173,726 filed Jun. 30, 2005;
U.S. patent application Ser. No. 11/172,781 filed Jun. 30, 2005;
U.S. patent application Ser. No. 11/174,067 filed Jun. 30, 2005;
U.S. patent application Ser. No. 11/173,854 filed Jun. 30, 2005; and
U.S. patent application Ser. No. 11/173,911 filed Jun. 30, 2005.

FIELD OF THE INVENTION

Certain embodiments of the invention relate to communication receivers. More specifically, certain embodiments of the invention relate to a method and system for single antenna receiver system for HSDPA.

BACKGROUND OF THE INVENTION

Mobile communications has changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers. In this regard, networks based on wideband CDMA (WCDMA) technology may make the delivery of data to end users a more feasible option for today's wireless carriers.

FIG. 1a is a technology timeline indicating evolution of existing WCDMA specification to provide increased downlink throughput. Referring to FIG. 1a, there is shown data rate spaces occupied by various wireless technologies, including General Packet Radio Service (GPRS) 100, Enhanced Data rates for GSM (Global System for Mobile communications) Evolution (EDGE) 102, Universal Mobile Telecommunications System (UMTS) 104, and High Speed Downlink Packet Access (HSDPA) 106.

The GPRS and EDGE technologies may be utilized for enhancing the data throughput of present second generation (2G) systems such as GSM. The GSM technology may support data rates of up to 14.4 kilobits per second (Kbps), while the GPRS technology, introduced in 2001, may support data rates of up to 115 Kbps by allowing up to 8 data time slots per time division multiple access (TDMA) frame. The GSM technology, by contrast, may allow one data time slot per TDMA frame. The EDGE technology, introduced in 2003, may support data rates of up to 384 Kbps. The EDGE technology may utilizes 8 phase shift keying (8-PSK) modulation for providing higher data rates than those that may be achieved by GPRS technology. The GPRS and EDGE technologies may be referred to as "2.5G" technologies.

The UMTS technology, introduced in 2003, with theoretical data rates as high as 2 Mbps, is an adaptation of the WCDMA 3G system by GSM. One reason for the high data rates that may be achieved by UMTS technology stems from the 5 MHz WCDMA channel bandwidths versus the 200 KHz GSM channel bandwidths. The HSDPA technology is an Internet protocol (IP) based service, oriented for data communications, which adapts WCDMA to support data transfer rates on the order of 10 megabits per second (Mbits/s). Developed by the 3G Partnership Project (3GPP) group, the HSDPA technology achieves higher data rates through a plurality of methods. For example, many transmission decisions may be made at the base station level, which is much closer to the user equipment as opposed to being made at a mobile switching center or office. These may include decisions about the scheduling of data to be transmitted, when data is to be retransmitted, and assessments about the quality of the transmission channel. The HSDPA technology may also utilize variable coding rates. The HSDPA technology may also support 16-level quadrature amplitude modulation (16-QAM) over a high-speed downlink shared channel (HS-DSCH), which permits a plurality of users to share an air interface channel In some instances, HSDPA may provide a two-fold improvement in network capacity as well as data speeds up to five times (over 10 Mbit/s) higher than those in even the most advanced 3G networks. HSDPA may also shorten the roundtrip time between network and terminal, while reducing variances in downlink transmission delay. These performance advances may translate directly into improved network performance and higher subscriber satisfaction. Since HSDPA is an extension of the WCDMA family, it also builds directly on the economies of scale offered by the world's most popular mobile technology. HSDPA may offer breakthrough advances in WCDMA network packet data capacity, enhanced spectral and radio access networks (RAN) hardware efficiencies, and streamlined network implementations. Those improvements may directly translate into lower cost-per-bit, faster and more available services, and a network that is positioned to compete more effectively in the data-centric markets of the future.

The capacity, quality and cost/performance advantages of HSDPA yield measurable benefits for network operators, and, in turn, their subscribers. For operators, this backwards-compatible upgrade to current WCDMA networks is a logical and cost-efficient next step in network evolution. When deployed, HSDPA may co-exist on the same carrier as the current WCDMA Release 99 services, allowing operators to introduce greater capacity and higher data speeds into existing WCDMA networks. Operators may leverage this solution to support a considerably higher number of high data rate users on a single radio carrier. HSDPA makes true mass-market mobile IP multimedia possible and will drive the consumption of data-heavy services while at the same time reducing the cost-per-bit of service delivery, thus boosting both revenue and bottom-line network profits. For data-hungry mobile subscribers, the performance advantages of HSDPA may translate into shorter service response times, less delay and faster perceived connections. Users may also download packet-data over HSDPA while conducting a simultaneous speech call.

HSDPA may provide a number of significant performance improvements when compared to previous or alternative technologies. For example, HSDPA extends the WCDMA bit rates up to 10 Mbps, achieving higher theoretical peak rates with higher-order modulation (16-QAM) and with adaptive coding and modulation schemes. The maximum QPSK bit rate is 5.3 Mbit/s and 10.7 Mbit/s with 16-QAM. Theoretical bit rates of up to 14.4 Mbit/s may be achieved with no channel coding. The terminal capability classes range from 900 Kbit/s to 1.8 Mbit/s with QPSK modulation, and 3.6 Mbit/s and up with 16-QAM modulation. The highest capability class supports the maximum theoretical bit rate of 14.4 Mbit/s.

However, implementing advanced wireless technologies such as WCDMA and/or HSDPA may still require overcoming some architectural hurdles. For example, the RAKE receiver is the most commonly used receiver in CDMA systems, mainly due to its simplicity and reasonable performance and WCDMA Release 99 networks are designed so that RAKE receivers may be used. A RAKE receiver contains a bank of spreading sequence correlators, each receiving an individual multipath. A RAKE receiver operates on multiple discrete paths. The received multipath signals can be combined in several ways, from which maximal ratio combining (MRC) is preferred in a coherent receiver. However, a RAKE receiver may be suboptimal in many practical systems, for example, its performance may degrade from multiple access interference (MAI), that is, interference induced by other users in the network.

In the case of a WCDMA downlink, MAI may result from inter-cell and intracell interference. The signals from neighboring base stations compose intercell interference, which is characterized by scrambling codes, channels and angles of arrivals different from the desired base station signal. Spatial equalization may be utilized to suppress inter-cell interference. In a synchronous downlink application, employing orthogonal spreading codes, intra-cell interference may be caused by multipath propagation. Due to the non-zero cross-correlation between spreading sequences with arbitrary time shifts, there is interference between propagation paths (or RAKE fingers) after despreading, causing MAI and inter-path interference (IPI). The level of intra-cell interference depends strongly on the channel response. In nearly flat fading channels, the physical channels remain almost completely orthogonal and intra-cell interference does not have any significant impact on the receiver performance. On the other hand, the performance of the RAKE receiver may be severely deteriorated by intra-cell interference in frequency selective channels. Frequency selectivity is common for the channels in WCDMA networks.

To combat MAI, linear interference suppression algorithms can be utilized, which are based on linear channel equalization and are suitable for WCDMA/HSDPA systems using long, orthogonal scrambling codes. Due to the difficulties faced when non-linear channel equalizers are applied to the WCDMA downlink, detection of the desired physical channel with a non-linear equalizer may result in implementing an interference canceller or optimal multi-user receiver. Both types of receivers may be prohibitively complex for mobile terminals and may require information not readily available at the mobile terminal. Alternatively, the total base station signal may be considered as the desired signal. However, non-linear equalizers rely on prior knowledge of the constellation of the desired signal, and this information is not readily available at the WCDMA terminal. The constellation of the total base station signal, that is, sum of all physical channels, is a high order quadrature amplitude modulation (QAM) constellation with uneven spacing. The spacing of the constellation changes constantly due to transmission power control (TPC) and possible power offsets between the control and data fields, time-multiplexed to the dedicated physical channels. The constellation order may also frequently change due to discontinuous transmission. This makes an accurate estimation of the constellation very difficult.

In this regard, the use of multiple transmit and/or receive antennas may result in an improved overall system performance. These multi-antenna configurations, also known as smart antenna techniques, may be utilized to mitigate the negative effects of multipath and/or signal interference on signal reception. It is anticipated that smart antenna techniques may be increasingly utilized both in connection with the deployment of base station infrastructure and mobile subscriber units in cellular systems to address the increasing capacity demands being placed on those systems. These demands arise, in part, from a shift underway from current voice-based services to next-generation wireless multimedia services that provide voice, video, and data communication.

The utilization of multiple transmit and/or receive antennas is designed to introduce a diversity gain and array gain and to suppress interference generated within the signal reception process. Such diversity gains improve system performance by increasing received signal-to-noise ratio, by providing more robustness against signal interference, and/or by permitting greater frequency reuse for higher capacity. In communication systems that incorporate multi-antenna receivers, a set of M receive antennas may be utilized to null the effect of (M−1) interferers, for example. Accordingly, N signals may be simultaneously transmitted in the same bandwidth using N transmit antennas, with the transmitted signal then being separated into N respective signals by way of a set of N antennas deployed at the receiver. Systems that utilize multiple transmit and receive antennas may be referred to as multiple-input multiple-output (MIMO) systems. One attractive aspect of multi-antenna systems, in particular MIMO systems, is the significant increase in system capacity that may be achieved by utilizing these transmission configurations. For a fixed overall transmitted power, the capacity offered by a MIMO configuration may scale with the increased signal-to-noise ratio (SNR).

However, the widespread deployment of multi-antenna systems in wireless communications, particularly in wireless handset devices, has been limited by the increased cost that results from increased size, complexity, and power consumption. Providing a separate RF chain for each transmit and receive antenna is a direct factor that increases the cost of multi-antenna systems. Each RF chain generally comprises a low noise amplifier (LNA), a filter, a downconverter, and an analog-to-digital converter (A/D). In certain existing single-antenna wireless receivers, the single required RF chain may account for over 30% of the receiver's total cost. It is therefore apparent that as the number of transmit and receive antennas increases, the system complexity, power consumption, and overall cost may increase. This poses problems for mobile system designs and applications.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for a single antenna receiver system for HSDPA, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for single antenna receiver system for HSDPA. Aspects of the invention may comprise may comprise computing channel estimates based on a plurality of received individual distinct path signals Timing reference signals may be generated indicating a location of at least one of the plurality of received individual distinct path signals. At least a portion of the plurality of received individual distinct path signals may be combined as a the cluster based on at least one of the computed channel estimates and said generated timing reference signals. At least one of the combining and equalization processing may be selected based on at least one of the computed channel estimates and the generated timing reference signals.

Figure 1A:
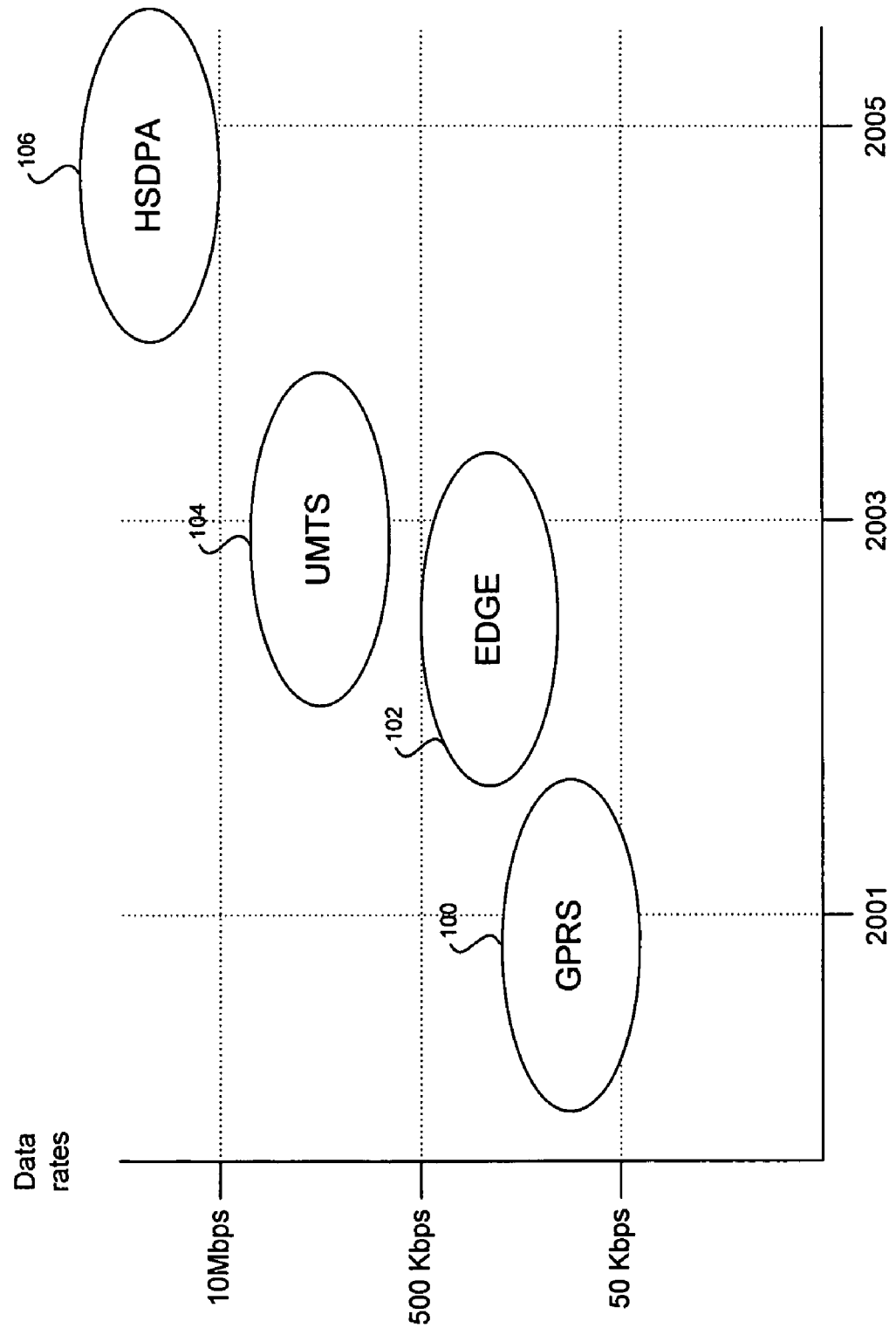
FIG. 1a is a technology timeline indicating the evolution of the existing WCDMA specification to provide increased downlink throughput, in connection with an embodiment of the invention.
Figure 1B:
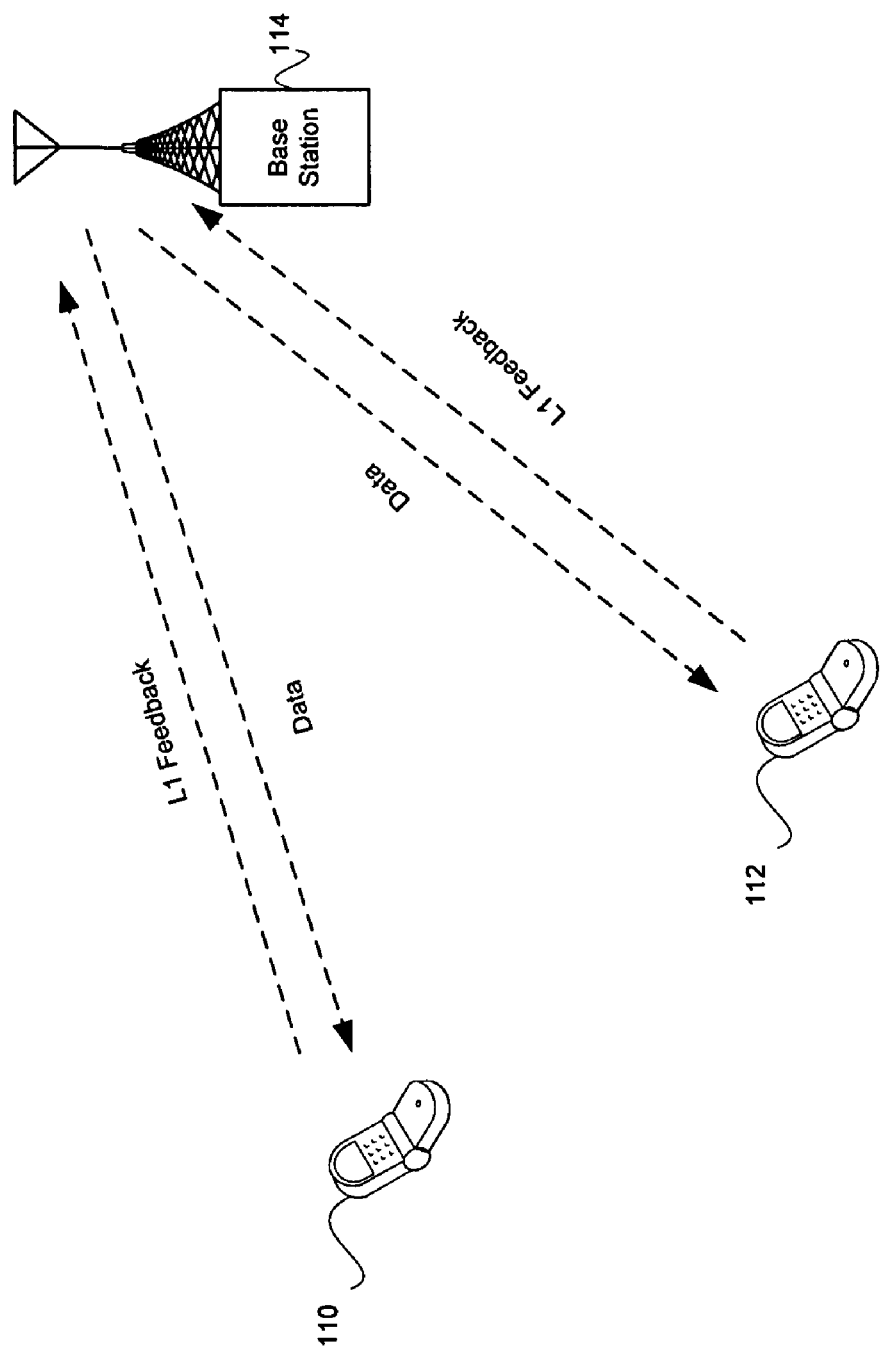
FIG. 1b illustrates an exemplary HSDPA distributed architecture that achieves low delay link adaptation, in connection with an embodiment of the invention.

FIG. 1b illustrates an exemplary HSDPA distributed architecture that achieves low delay link adaptation, in connection with an embodiment of the invention. Referring to FIG. 1b, there is shown terminals 110 and 112 and a base station (BS) 114. HSDPA is built on a distributed architecture that achieves low delay link adaptation by placing key processing at the BS 114, which may be a medium access control (MAC), closer to the physical layer (PHY) air interface as illustrated. HSDPA leverages methods that are well established within existing GSM/EDGE standards, including fast physical layer (L1) retransmission combining and link adaptation techniques, to deliver significantly improved packet data throughput performance between the mobile terminals 110 and 112 and the BS 114.

The HSDPA technology employs several important new technological advances. Some of these may comprise scheduling for the downlink packet data operation at the BS 114, higher order modulation, adaptive modulation and coding, hybrid automatic repeat request (HARQ), physical layer feedback of the instantaneous channel condition, and a new transport channel type known as high-speed downlink shared channel (HS-DSCH) that allows several users to share the air interface channel. When deployed, HSDPA may co-exist on the same carrier as the current WCDMA and UMTS services, allowing operators to introduce greater capacity and higher data speeds into existing WCDMA networks. HSDPA replaces the basic features of WCDMA, such as variable spreading factor and fast power control, with adaptive modulation and coding, extensive multicode operation, and fast and spectrally efficient retransmission strategies.

In current-generation WCDMA networks, power control dynamics are on the order of 20 dB in the downlink and 70 dB in the uplink. WCDMA downlink power control dynamics are limited by potential interference between users on parallel code channels and by the nature of WCDMA base station implementations. For WCDMA users close to the base station, power control cannot reduce power optimally, and reducing power beyond the 20 dB may therefore have only a marginal impact on capacity. HSDPA, for example, utilizes advanced link adaptation and adaptive modulation and coding (AMC) to ensure all users enjoy the highest possible data rate. AMC therefore adapts the modulation scheme and coding to the quality of the appropriate radio link.

Figure 1C:
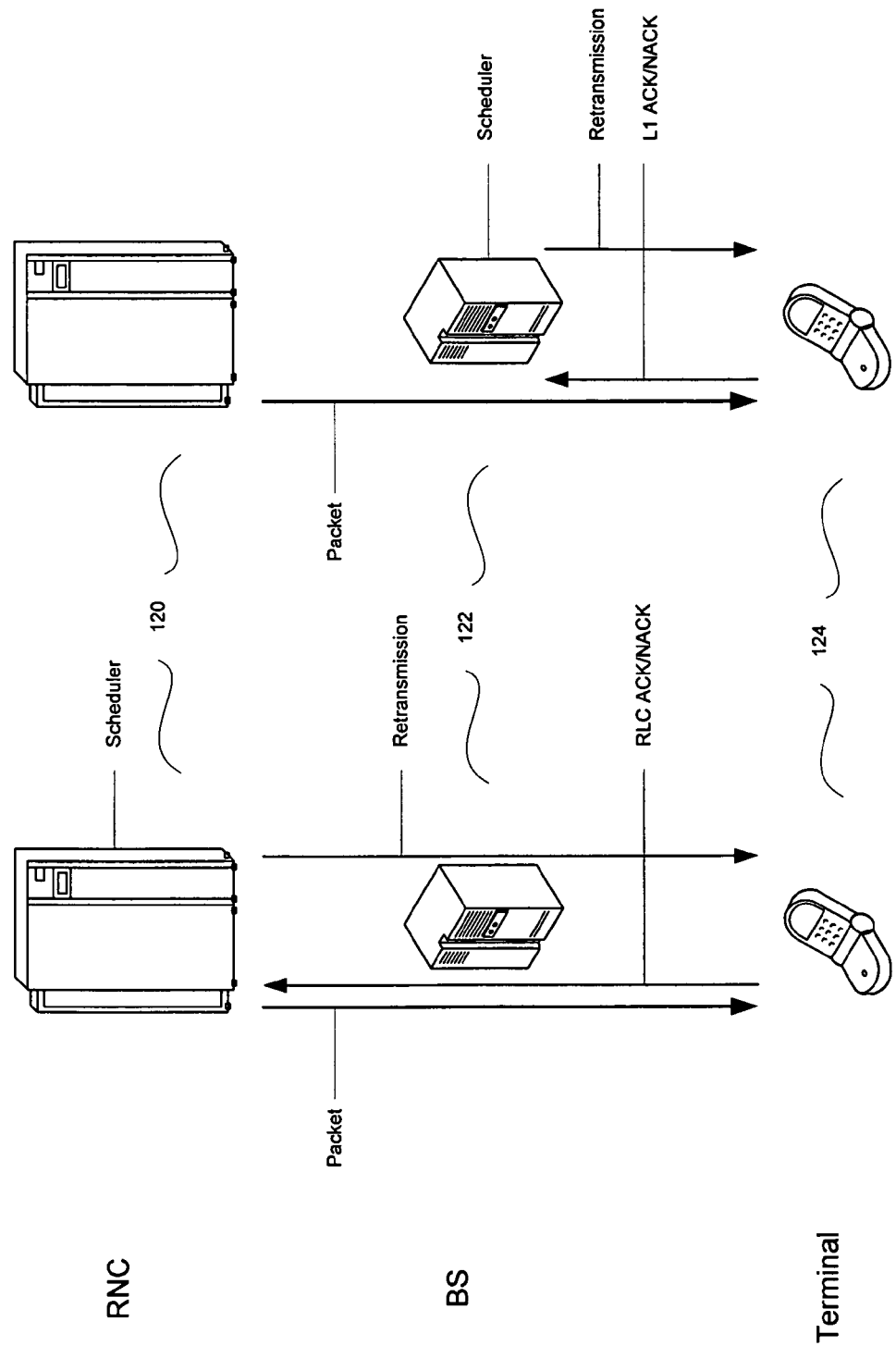
FIG. 1c illustrates an exemplary Layer 1 HARQ control situated in a base station to remove retransmission-related scheduling and storing from the radio network controller, in connection with an embodiment of the invention.

FIG. 1c illustrates an exemplary Layer 1 HARQ control situated in a base station to remove retransmission-related scheduling and storing from the radio network controller, in connection with an embodiment of the invention. Referring to FIG. 1c, there is shown a hybrid automatic repeat request (HARQ) operation, which is an operation designed to reduce the delay and increase the efficiency of retransmissions. Layer 1 HARQ control is situated in the Node B, or base station (BS), 122 thus removing retransmission-related scheduling and storing from the radio network controller (RNC) 120. This HARQ approach avoids hub delay and measurably reduces the resulting retransmission delay.

For example, when a link error occurs, due to signal interference or other causes, a mobile terminal 124 may request the retransmission of the data packets. While current-generation WCDMA networks handle those retransmission requests through the radio network controller 120, HSDPA retransmission requests are managed at the base station 122. Furthermore, received packets are combined at the physical (PHY) layer and retrieved only if successfully decoded. If decoding has failed, the new transmission is combined with the old transmission before channel decoding. The HSDPA approach allows previously transmitted frames (that failed to be decoded) to be combined with the retransmission. This combining strategy provides improved decoding efficiencies and diversity gains while minimizing the need for additional repeat requests.

While the spreading factor may be fixed, the coding rate may vary between ¼ and ¾, and the HSDPA specification supports the use of five, 10 or 15 multicodes. More robust coding, fast HARQ, and multi-code operation eliminates the need for variable spreading factor and also allows for more advanced receiver structures in the mobile such as equalizers as apposed to the traditional RAKE receiver used in most CDMA systems. This approach may also allow users having good signal quality or higher coding rates and those at the more distant edge of the cell having lower coding rates to each receive an optimum available data rate.

By moving data traffic scheduling to the base station 122, and thus closer to the air interface, and by using information about channel quality, terminal capabilities, QoS, and power/code availability, HSDPA may achieve more efficient scheduling of data packet transmissions. Moving these intelligent network operations to the base station 122 allows the system to take full advantage of short-term channel variations, and thus to speed and simplify the critical transmission scheduling process. The HSDPA approach may, for example, manage scheduling to track the fast fading of the users and when conditions are favorable to allocate most of the cell capacity to a single user for a very short period of time. At the base station 122, HSDPA gathers and utilizes estimates of the channel quality of each active user. This feedback provides current information on a wide range of channel physical layer conditions, including power control, ACK/NACK ratio, QoS, and HSDPA-specific user feedback.

While WCDMA Release 99 or WCDMA Release 4 may support a downlink channel (DCH) or a downlink shared channel (DSCH), the HSDPA operation provided by WCDMA Release 5 may be carried on a high-speed downlink shared channel (HS-DSCH). This higher-speed approach uses a 2-ms frame length, compared to DSCH frame lengths of 10, 20, 40 or 80 ms. DSCH utilizes a variable spreading factor of 4 to 256 chips while HS-DSCH may utilize a fixed spreading factor of 16 with a maximum of 15 codes. HS-DSCH may supports 16-level quadrature amplitude modulation (16-QAM), link adaptation, and the combining of retransmissions at the physical layer with HARQ. HSDPA also leverages a high-speed shared control channel (HS-SCCH) to carry the required modulation and retransmission information. An uplink high-speed dedicated physical control channel (HS-DPCCH) carries ARQ acknowledgements, downlink quality feedback and other necessary control information on the uplink.

Figure 1D:
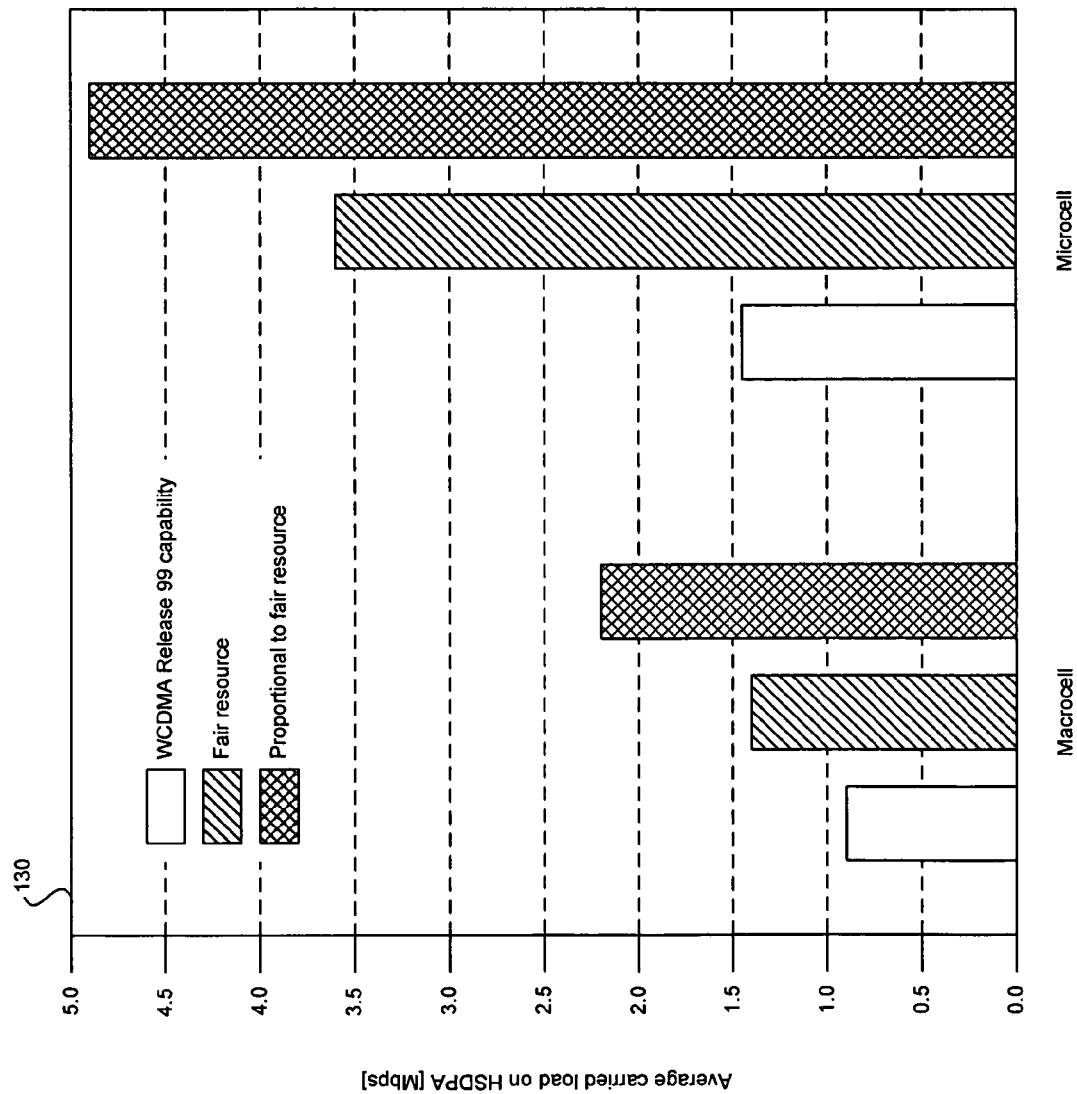
FIG. 1d is a chart illustrating exemplary average carried loads for HSDPA-based macrocell and microcell systems, in connection with an embodiment of the invention.

FIG. 1d is a chart illustrating exemplary average carried loads for HSDPA-based macrocell and microcell systems, in connection with an embodiment of the invention. Referring to chart 130 in FIG. 1d, in practical deployments, HSDPA more than doubles the achievable peak user bit rates compared to WCDMA Release 99. With bit rates that are comparable to DSL modem rates, HS-DSCH may deliver user bit rates in large macrocell environments exceeding 1 Mbit/s, and rates in small microcells up to 5 Mbit/s. The HSDPA approach supports both non-real-time UMTS QoS classes and real-time UMTS QoS classes with guaranteed bit rates.

Cell throughput, defined as the total number of bits per second transmitted to users through a single cell, increases 100% with HSDPA when compared to the WCDMA Release 99. This is because HSDPA's use of HARQ combines packet retransmission with the earlier transmission, and thus no transmissions are wasted. Higher order modulation schemes, such as 16-QAM, enable higher bit rates than QPSK-only modulation in WCDMA Release 99, even when the same orthogonal codes are used in both systems. The highest throughput may be obtained with low inter-path interference and low inter-cell interference conditions. In microcell designs, for example, the HS-DSCH may support up to 5 Mbit/s per sector per carrier, or 1 bit/s/Hz/cell.

Figure 2A:
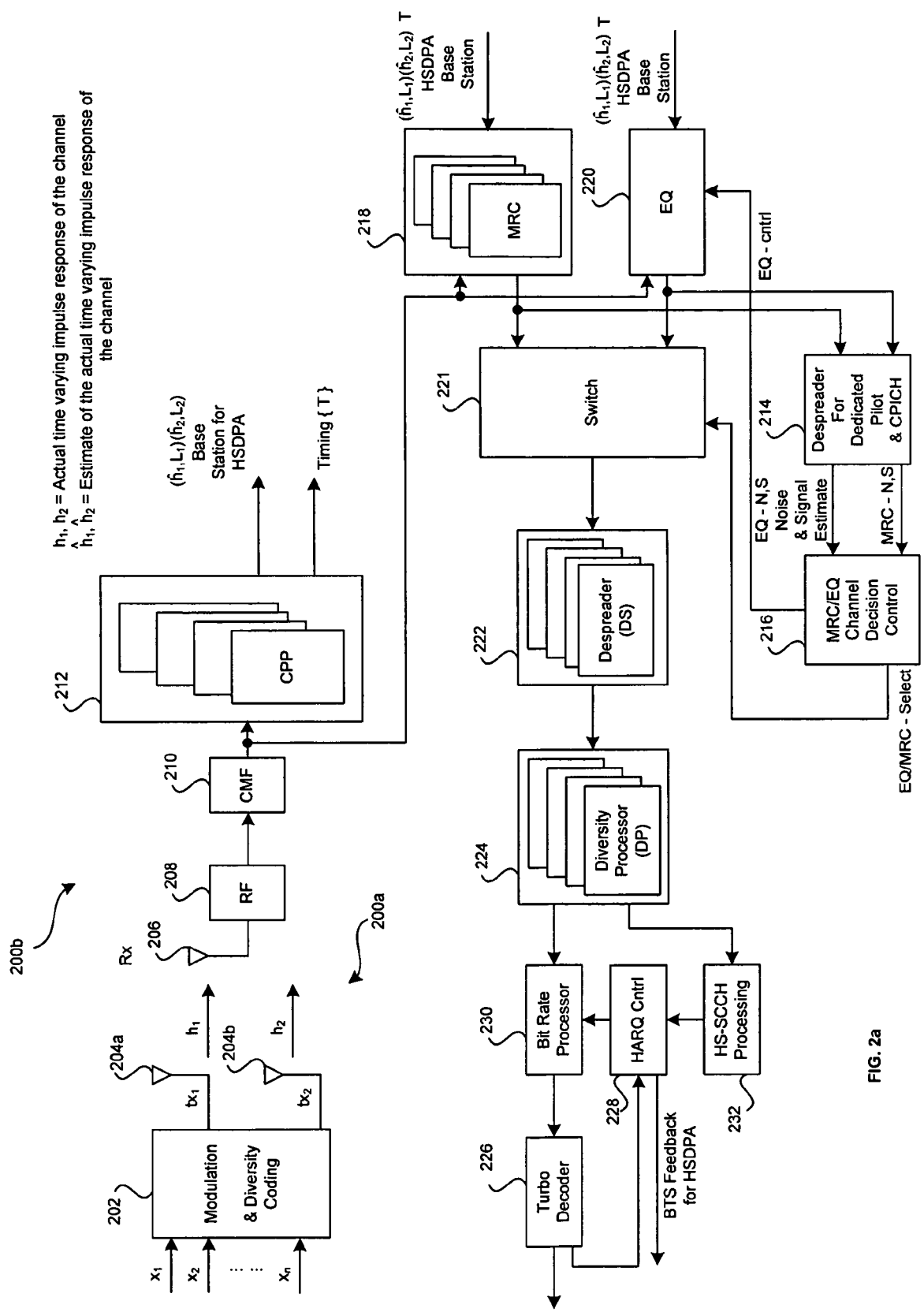
FIG. 2a is a block diagram of a single antenna receiver system for HSDPA, in accordance with an embodiment of the invention.

FIG. 2a is a block diagram of an exemplary single antenna receiver system for HSDPA, in accordance with an embodiment of the invention. Referring to FIG. 2a, there is shown a transmitter section 200a, and a receiver section 200b. The transmitter section 200a may comprise a modulation and diversity coding block 202 and a plurality of antennas 204a, 204b. The receiver section 200b may comprise an antenna 206, an RF block 208, a chip matched filter block 210, a cluster path processor block 212, a despreader for common and dedicated pilot signals block 214, a maximum ratio combining and equalization channel decision control block 216, and a maximum ratio combining block 218. The receiver section 200b may further comprise, an equalization block 220, a switch 221, a despreader block 222, a diversity processor block 224, a turbo decoder block 226, an HARQ-controller block 228, a bit rate processor block 230, and a high speed secondary common control channel (HS-SCCH) block 232.

On the transmit side 200a, the modulation and diversity coding block 202 may be adapted to receive inputs $x_1$, $x_2, \ldots x_n$, and to generate modulated signals $tx_1, tx_2, \ldots, tx_n$, which may be transmitted via antenna 204 via a base station transmitting HSDPA signals.

On the receive side 200b, the RF block 208 may comprise suitable logic, circuitry, and/or code that may be adapted to amplify and convert the analog RF signal, received by the antenna 206, down to baseband. The RF block 208 may comprise an analog-to-digital (A/D) converter that may be utilized to generate a digital equivalent of the received analog signal.

The chip matched filter block 210 may comprise suitable logic, circuitry, and/or code that may be adapted to filter the output of the RF block 208 and to produce complex in-phase and quadrature components (I, Q) of the filtered signal. In this regard, in an embodiment of the invention, the chip matched filter block 210 may comprise a pair of digital filters that are adapted to filter the I and Q components to within, for example, the 3.84 MHz bandwidth of W-CDMA baseband.

The cluster path processor block 212 may comprise suitable logic, circuitry and/or code that may be adapted to receive and process an output of the chip matched filter block 210 for the HSDPA. A signal cluster may comprise an aggregate of individual distinct path signals received over a specified time interval, where the specified time interval may be of sufficient length to permit a plurality of individual distinct path signals to be received prior to the transmission of a subsequent signal cluster. U.S. application Ser. No. 11/173,854 provides a detailed description of signal cluster and is hereby incorporated herein by reference in its entirety. In one embodiment of the invention, in the receiver 200b, the cluster path processor 212 may partitioned into a pair of processors. The cluster path processor 212 may be adapted to generate a timing reference signal, T, that time-wise tracks the location of received multipath signals from a RF channel. The timing reference signal, T, may be utilized by each of the plurality of blocks contained in the receiver 200b as illustrated in FEG. 2a. Notwithstanding, the invention is not limited in this regard, and other cluster path processor configurations may be utilized. The cluster processor 212 may also be adapted to compute complex estimates of the time varying impulse response of the RF channel, or "channel estimates", where the channel estimates may represent estimations of the actual time varying impulse response of the RF channel associated with the base station transmit antenna, the estimates may be denoted $\hat{h}_1$ and $\hat{h}_2$. Corresponding lock indicators $L_1$ and $L_2$ may also be generated by the cluster processors. The lock indicators may provide an indication of which components in the corresponding estimates comprise valid component values. The cluster path processor 212 may be configured to operate as a pair when a signal is transmitted by two antennas, where the two antennas may be located in the same base station. The configurations in which a receiving antenna receives signals from two transmitting antenna is described as "receiving modes" in the W-CDMA standard. These receiving modes may comprise closed loop 1 (CL1), close loop 2 (CL2), and space time transmit diversity (STTD). The cluster path processor block 212 may be adapted to assign cluster processors on a per base station basis.

The despreader for common and dedicated pilot signals block 214 may comprise suitable circuitry, logic, and/or code that may be adapted to utilize received signals from the maximum ratio combiner 218 and the equalization block 220, to compute estimates for at least a portion of the transmitter 202 inputs $x_1, x_2, \ldots x_n$, corresponding to common and dedicated pilot channels. In addition, the despreader for common and dedicated pilot signals block 214 may compute estimates for signal and noise contained in the output after processing from the maximum ratio combiner 218 and the equalization block 220. Noise components may have been introduced while the signal from the transmitter 200a was propagated through the transmission medium between the transmitter 200a, to the receiver 200b.

The maximum ratio combining and equalization channel decision control block 216 may comprise suitable logic, circuitry, and/or code that may be adapted to generate a signal which may be utilized by the switch 221 to select either the output from the maximum ratio combining block 218 or the equalization block 220 for further processing in the receiver 200b. Based on a received signal tuple ($x_{EQ}$, $n_{EQ}$), the maximum ratio combining and equalization channel decision control block 216 may generate an equalizer control signal, EQ-cntrl, which may be utilized to control the operation of the equalizer 220. The decision may be based on the post processing output after the MRC operation and subsequent computation of dedicated and common pilot symbols. In a similar manner, the decision may also be based on the post processing output after the equalizer and subsequent computation of the dedicated and common pilot symbols. The dedicated and common pilot symbols can be utilized to construct an estimate of the received SNR after processing by both the MRC and equalizer. The processor that yields the best SNR (i.e. MRC or Equalizer) may be selected for subsequent downstream processing and eventual TURBO decoding.

The maximum-ratio combining block 218 may comprise suitable logic, circuitry and/or code to receive timing reference signals, T, and channel estimates and lock indicators, ($\hat{h}_1, L_1$) and ($\hat{h}_2, L_2$), from the corresponding cluster path processor block 212, which may be utilized by the maximum-ratio combining block 218 to process received signals from the chip matched filter block 210. The maximum ratio combining block 218 may utilize channel estimate components in accordance with the corresponding lock indicator, utilizing channel estimate components that are valid in accordance with the corresponding lock indicator. Channel estimate components that are not valid, in accordance with the corresponding lock indicator, may not be utilized. The maximum-ratio combining block 218 may be adapted to provide a combining scheme or mechanism for implementing a rake receiver which may be utilized with adaptive antenna arrays to combat noise, fading, and, co-channel interference.

In accordance with an embodiment of the invention, each of the maximum-ratio combining block 218 may comprise suitable logic, circuitry, and/or code that may be adapted to add individual distinct path signals, received from the assigned RF channel, together in such a manner to achieve the highest attainable signal to noise ratio (SNR). The highest attainable SNR may be based upon a maximal ratio combiner. A maximal ratio combiner is a diversity combiner in which each of the multipath signals from all received multipaths are added together, each with unique gain. The gain of each multipath before summing can be made proportional to the received signal level for the multipath, and inversely proportional to the multipath noise level. The maximum-ratio combining block 218 may be also adapted to utilize other techniques for signal combining such as selection combiner, switched diversity combiner, equal gain combiner, or optimal combiner.

In one embodiment of the invention, the assignment of fingers in the maximum-ratio combining block 218 may be based on channel estimates h1 and h2 from the cluster path processor block 212. The proportionality constants utilized in the maximum-ratio combining block 218 may be based on the valid channel estimates, $\hat{h}_1$ and $\hat{h}_2$, from the cluster path processor block 212, for example.

The equalizer, or equalization, block 220 may comprise suitable logic circuitry and/or code that may be adapted to effectively transform the channel from a frequency selective channel to a flat fading channel. In this regard, the equalization block 220 may be adapted to utilize, for example, an adaptive algorithm to adaptively calculate weights and iteratively search for an optimal weight solution. The equalization block 220 may receive channel estimates and lock indicators, ($\hat{h}_1, L_1$), from the cluster path processor block 212, which may be utilized to calculate weights. The equalization block 220 may utilize channel estimate components in accordance with the corresponding lock indicator, utilizing channel estimate components that are valid in accordance with the corresponding lock indicator. Channel estimate components that are not valid, in accordance with the corresponding lock indicator, may not be utilized. In accordance with an embodiment of the invention, the equalization block 220 may be adapted to utilize, for example, a least mean square (LMS) algorithm for the weight calculation. The LMS algorithm may provide a good compromise between implementation complexity and performance gains. Notwithstanding, the invention is not limited in this regard, and other weight calculation algorithms may be utilized.

The switch block 221 may comprise suitable logic, circuitry and/or code that may be adapted to take decision output signals from the maximum ratio combining decision control block 216 and generate an output signal that may be based on selection of either a received input signal from the maximum ratio combining block 218, or a received input signal from the equalization block 220.

The despreader block 222 may comprise suitable logic, circuitry, and/or code that may be adapted to despread received signals that had previously been spread through the application of orthogonal spreading codes in the transmitter. Prior to transmission of an information signal, known as a "symbol", the transmitter may have applied an orthogonal spreading code that produced a signal comprising a plurality of "chips". The despreader block 222 may be adapted to generate local codes, for example Gold codes or orthogonal variable spreading factor (OVSF) codes, that may be applied to received signals through a method which may comprise multiplication and accumulation operations. Processing gain may be realized after completion of integration over a predetermined number of chips over which the symbol is modulated.

Following despreading at the receiver, the original symbol may be extracted. The W-CDMA standard may support the simultaneous transmission of a plurality of spread spectrum signals in a single RF signal by utilizing spreading codes among the spread spectrum signals which are orthogonal to reduce multiple access interference (MAI). The receiver may extract an individual symbol from the transmitted plurality of spread spectrum signals by applying a despreading code which is equivalent to the code that was utilized in generating the spread spectrum signal.

The diversity processor 224 may comprise suitable logic, circuitry, and/or code that may be adapted to combine signals transmitted from multiple antennas in diversity modes. The diversity modes may comprise OL, CL1 and CL2. The diversity processor 224 may combine signals transmitted from a plurality of antennas that are located at the same base station.

The turbo decoder block 226 may comprise suitable logic, circuitry, and/or code that may be adapted to handle decoding of turbo codes. In particular, the turbo decoder block 240 may process received signals containing data.

The H-Control block 228 may comprise suitable logic, circuitry, and/or code that may be adapted to perform hybrid ARQ processing for received signals containing HSDPA information.

The bit rate processing block 230 may comprise suitable logic, circuitry and/or code to process data frames received from the diversity processor 224. The processing may further comprise depuncturing, and deinterleaving data in the received frame, and further determining a rate at which processed frames are communicated in output signals.

The HS-SCCH processing block 232 may comprise suitable logic, circuitry and/or code to extract information comprising parameters utilized by the transmitter 202 for transmitting input signals $x_1, x_2, \ldots x_n$, to the receiver 200b via an RF channel. Examples of parameters may comprise information pertaining to interleaving and/or deinterleaving, and information pertaining to puncture and/or depuncture, of binary information contained in the input signals, $x_1, x_2, \ldots x_n$.

In operation the cluster path processor block 212 may generate a set of channel estimates and lock indicators, $(\hat{h}_1, L_1)$, a set of channel estimates and lock indicators, $(\hat{h}_2, L_2)$, and a timing reference signal T.

The maximum-ratio combining block 218 may be adapted to utilize the channel estimates and lock indicators $(\hat{h}_1, L_1)$, $(\hat{h}_2, L_2)$ and timing information T to assign rake fingers to received individual distinct path signals and to assign proportionality constants to each finger. Received individual distinct path signals may be processed in the maximum-ratio combining block 218 as signal clusters comprising a plurality of received individual distinct path signals. In an embodiment of the invention, the maximum-ratio combining block 218 may assign a time, T(n), to the $n^{th}$ grid element of the CPP 212, where the plurality of times T(n) may be based on the timing reference T. Given a time assignment, and a time offset, $t_{off}$, a given CPP 212, n, may detect an individual distinct path signal that is received during a time interval starting at [T(n)−$t_{off}/2$], and ending at [T(n)+$t_{off}/2$].

The individual distinct path signals received collectively for each CPP 212 grid element, or element, may constitute a signal cluster. The relationship of the values T(n) among the processing elements of the CPP 132 in the receiver may be such that T(n+1)−T(n) is equal to a constant value for values of n among the set of fingers. Thus, once T is determined, the timing relationships for the receipt of the plurality of individual distinct path signals constituent in the signal cluster may be determined. The time offset value, $t_{off}$, may represent a time duration, which is at least as long as the period of time required for transmitting the plurality of chips contained in a symbol. For example, if the symbol comprises 16 chips, and the W-CDMA chip rate is $3.84 \times 10^6$ chips/second, then the time offset $t_{off}$ may be $(16/3.84 \times 10^6)$ seconds, or approximately 4 microseconds. Embodiments of the invention may not be limited to values of the difference T(n+1)−T(n) being constant among all n fingers in a rake receiver. However, each value, T(n), may be based on the timing reference signal, T.

In operation, the despreader for common and dedicated pilot signals block 214 may receive input signals from the maximum ratio combining block 218, and from the equalizer block 220. The despreader for common and dedicated pilot signals block 214 may compute estimates for signal, $x_{MRC}$, and noise, $n_{MRC}$ based on the signal received from the maximum ratio combiner block 218. The despreader for common and dedicated pilot signals block 214 may compute estimates for signal, $x_{EQ}$, and noise, $n_{EQ}$ based on the signal received from the equalizer block 220. The estimate for noise, $n_{EQ}$, may be computed based on a received dedicated pilot signal transmitted by the transmitter 200a.

The maximum ratio combining and equalization channel decision control block 216 may receive input signals comprising $x_{MRC}$ and $n_{MRC}$, and $x_{EQ}$ and $n_{EQ}$, from the maximum ratio combiner 218, and the equalizer 220, respectively. The maximum ratio combining and equalization channel decision control block 216 may generate an EQ/MRC select signal based on the received inputs. The select signal may be generated in accordance with the signal tuple, comprising ($x_{MRC}$, $n_{MRC}$) and ($x_{EQ}$, $n_{EQ}$), that corresponds to a lower signal to noise ratio (SNR), for example. In such case, the switch, 221 may select an input from the maximum ratio combiner block 218, or the equalizer 220, based on the select input received from the maximum ratio combining and equalization channel decision control block 216.

Based on a received signal tuple ($x_{EQ}$, $n_{EQ}$), the maximum ratio combining and equalization channel decision control block 216 may generate an equalizer control signal, EQ-cntrl. The equalizer 220 may utilize the control signal EQ-cntrl to control the processing of signals received from the CMF block 210. Utilization of the EQ-cntrl signal may improve the SNR associated with subsequent signals output by the equalizer 220.

For example, for fast time variations in $\hat{h}_1$ and $\hat{h}_2$, or "fast fading", which may be indicated by high Doppler values and where the transmit antenna 202a and/or the receive antennas 206 may be moving at high speeds with respect to each other, the maximum ratio combining block 218 may yield better performance than the equalization block 220 because of slow equalization convergence time, or computation requirements for direct matrix inversions. In such case, the output from the maximum ratio combining block 218 may be selected for further processing by the maximum ratio combining and equalization channel decision control block 216. For high delay spread values, the output from the maximum ratio combining block 218 may be selected. The output from the maximum ratio combining block 218, the equalization block 220, and the pilot filter bandwidth values may be different for the similar Doppler values. For a system that may utilize multiple antenna channel estimation with phase rotation, the maximum ratio combining block 218 may yield better receiver performance.

Based on a select signal from the maximum ratio combining and equalization channel decision control block 216, the switch 221 may be configured to select either an output from the maximum ratio combining block 218, or an output from the equalization block 220, for subsequent processing by the despreader block 222, followed by further processing by the diversity processor block 224.

The output from the diversity processor 224 may be communicated to the bit rate processor 230, and the HS-SCCH processing block 232. The bit rate processing block 230 may perform processing tasks comprising depuncture and deinterleave on received data frames that are communicated in received individual distinct path signals. The bit rate processing block 230 may determine a rate a which to communicate processed data frames to the turbo decoder block 226. The bit rate processor block 230 may store processed data frame in local memory subsequent to communicating the processed data frame to the turbo decoder block 226.

When processing the received data frame, the bit rate processor 230 may utilize a depuncture rate and deinterleaving pattern based on information in an input signal received from the HARQ control block 228. In addition, the bit rate processor 230 may purge previously processed data frames from local memory in accordance with an indication received from the HARQ control block 228.

The HS-SCCH processing block 232 may receive information comprising transmission parameters that were utilized by the transmitter 202 when transmitting information to the receiver 200b via an RF channel. The transmission parameters received by the HS-SCCH processing block 232 may comprise parameters that are to be utilized by the HARQ control block 228, and the bit rate processor block 230, for decoding subsequent received data frames. The HS-SCCH processing block 232 may communicate received transmission parameter information to the HARQ control block 228.

The processed data frames from the bit rate processor may be further processed by the turbo decoder block 226. Subsequent to the further processing by the turbo decoder block 226 may communicate an indication to the HARQ control block 228. This indication may indicate to the HARQ control block 228 whether the subsequent processing by the turbo decoder block 226 achieved a successful result.

The HARQ control block 228 may receive the transmission parameter information from the HS-SCCH processing block 232, and the indication from the turbo decoder block 226. The HARQ control block 228 may generate a signal to the bit rate processor 230 comprising information that may be utilized for depuncturing and/or deinterleaving received data frame, and for enabling the bit rate processor 230 to determine whether previously processed data frames should be purged from local memory.

Figure 2B:
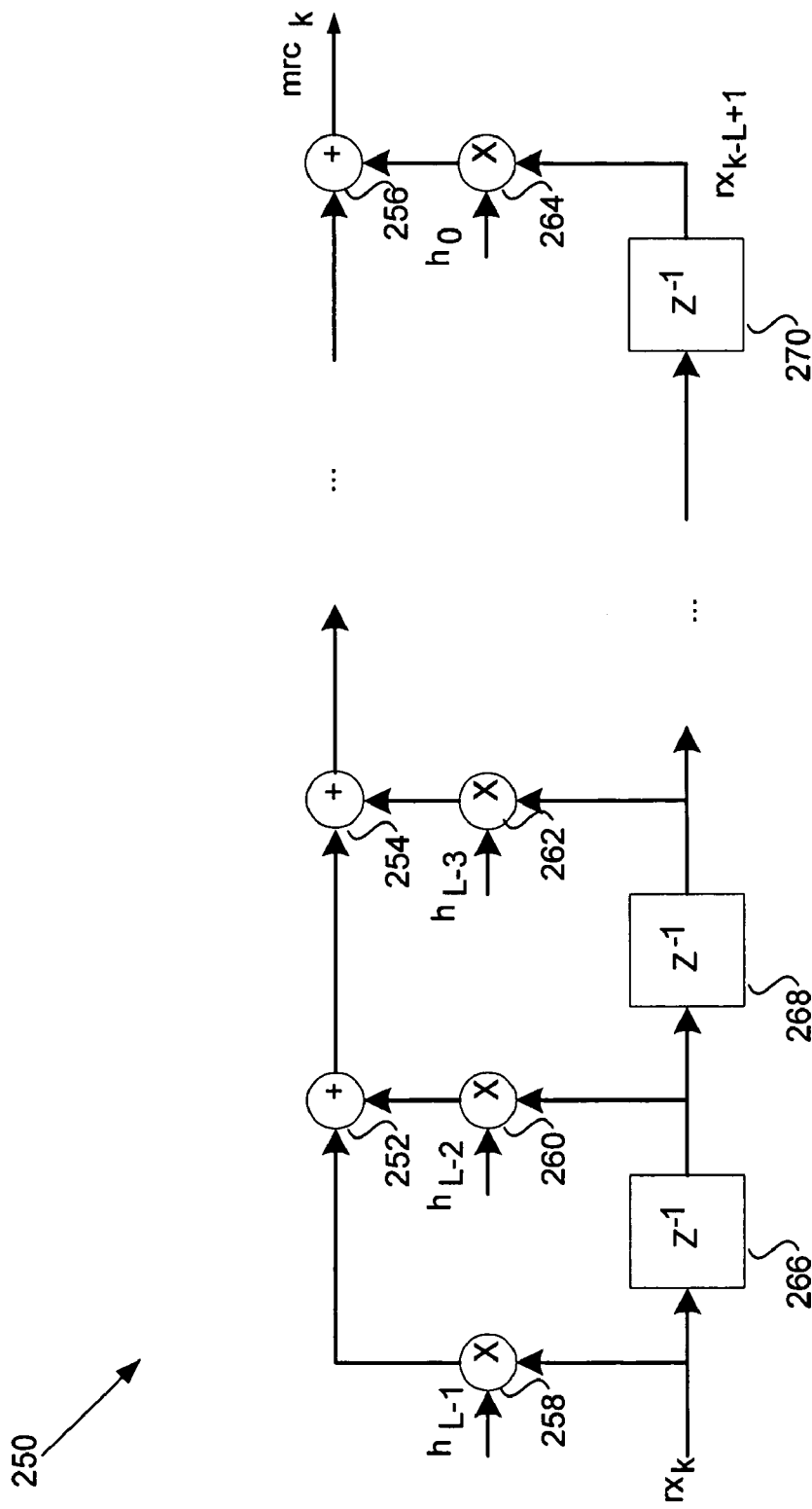
FIG. 2b is a block diagram illustrating exemplary MRC operation, in accordance with an embodiment of the invention.

FIG. 2b is a block diagram illustrating exemplary MRC operation, in accordance with an embodiment of the invention. Referring to FIG. 2b, the maximum-ratio combining (MRC) block 250 may comprise a plurality of adders 252, ..., 256, a plurality of multipliers 258, ..., 264, and a plurality of delay blocks 266, ..., 270. In one embodiment of the invention, the MRC block 250 may receive a plurality of channel estimates $h_{ik}$ (i=0, 1, ..., L−1) from a corresponding cluster path processor block. For example, the MRC block 250 may receive estimate vectors $\hat{h}_1$ and $\hat{h}_2$ of the actual time varying impulse response of a channel, from a cluster path processor. Each of the estimate vectors $\hat{h}_1$ and $\hat{h}_2$ may comprise a cluster grid of channel estimates $h_{ik}$ (i=0, 1, ..., L−1), where L may indicate the width of the cluster grid of estimates and may be related to the delay spread of the channel.

In operation, the MRC block 250 may be adapted to implement the following equation:

$$mrc_k = \sum_{i=0}^{L-1} h_{L-1-i} \cdot rx_{k-i},$$

where $mrc_k$ is the output of the MRC block 250, $h_{L-1-i}$ is the plurality of channel estimates corresponding to a channel estimate vector, such as $\hat{h}_1$ and $\hat{h}_2$, and $rx_k$ is a filtered complex input signal. The MRC block 250 may be adapted to add individual distinct path signals together in such a manner to achieve a high signal to noise ratio (SNR) in an output signal $mrc_k$.

The MRC block 250 may receive a filtered complex signal $rx_k$ from a chip matched filter (CMF), for example. The filtered complex signal $rx_k$ may comprise in-phase (I) and quadrature (Q) components of a received signal. Furthermore, the filtered complex signal $rx_k$ may be gated by cluster path processor (CPP) output strobes derived from a CPP timing reference, for example. Channel estimates $hi_k$ (i=0, 1, ..., L−1) may be applied to the CMF output $rx_k$ beginning with the last in time, $h_{L-1}$, and proceeding with channel estimates $h_{L-2}$, ..., $h_0$, utilizing multiplier blocks 258, ..., 264, respectively. The filtered complex input signal $rx_k$ may be continuously delayed by delay blocks 266, ..., 270. Each delayed output of the delay blocks 266, ..., 270 may be multiplied by the multiplier blocks 260, ..., 264, respectively, utilizing corresponding channel estimates $hi_k$. The outputs of the multipliers 252, ..., 256 may be added to generate the output signal $mrc_k$, thereby implementing the above-referenced MRC equation.

Figure 3:
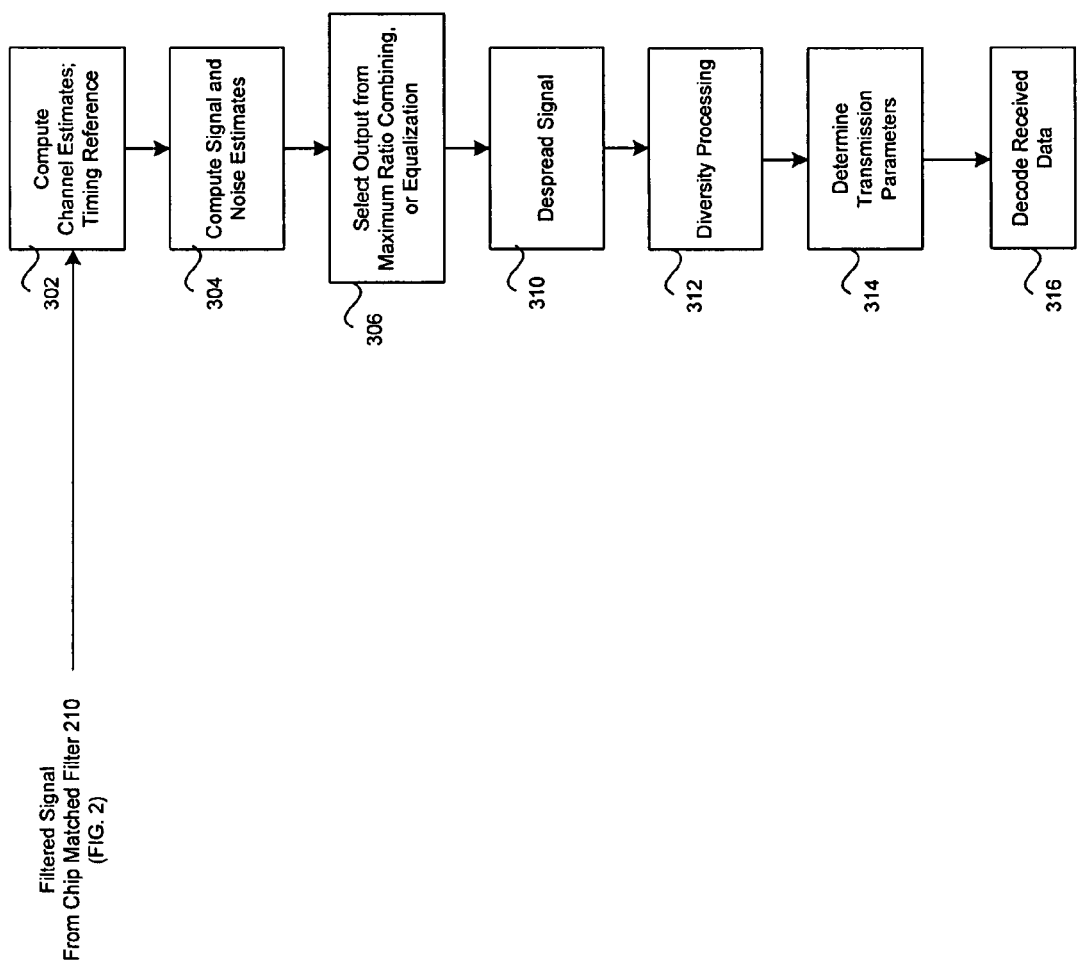
FIG. 3 is a flow chart illustrating exemplary steps for output selection in a single antenna receiver system HSDPA, in accordance with an embodiment of the invention.

FIG. 3 is a flow chart illustrating exemplary steps for output selection in a single antenna receiver system HSDPA, in accordance with an embodiment of the invention. With reference to FIG. 3, in step 302 channel estimates and a timing reference signal may be generated. In step 304, signal and noise estimates may be computed based on a signal received from the maximum ratio combining block 218 and the equalization block 220, respectively. A mode select signal may be generated. In step 306, the switch 221 may utilize the mode select signal to select an input signal received from either the EQ 220, or the MRC 218. An output signal may be generated based on the selected input signal. In step 310, the output signal generated by the switch 221 may be despread by the despreader 222. In step 312, diversity processing may be performed on signals received from a plurality of base stations by the diversity processor 224. In step 314, transmission parameters may be determined by the HARQ controller 228 and the HS-SCCH processor 232. In step 316, these parameters may be utilized by the turbo decoder 226 to decode the received data.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing radio frequency (RF) signals, the method comprising:
   computing channel estimates based on at least one of a plurality of received individual distinct path signals;
   generating timing reference signals indicating a location of said at least one of said plurality of received individual distinct path signals;
   combining at least a portion of said plurality of received individual distinct path signals as a signal cluster based on at least one of said computed channel estimates and said generated timing reference signals; and
   selecting one or both of a result of said combining and/or a result of equalization processing, said selecting is based on a comparison of estimates, said estimates comprising one or both of a signal level and/or a noise level corresponding to said result of said combining, and one or both of a signal level and/or a noise level corresponding to said result of said equalization processing.

2. The method according to claim 1, comprising processing said at least one of a plurality of received individual distinct path signals to generate said result of equalization processing.

3. The method according to claim 1, comprising receiving each of said plurality of received individual distinct path signals at a different time instant.

4. The method according to claim 3, wherein said different time instants are determined based on said generated timing reference signals.

5. The method according to claim 1, wherein said signal cluster comprises said at least a portion of said plurality of received individual distinct path signals.

6. The method according to claim 1, comprising despreading at least a portion of said result of said combining, and computing said one or both of a signal level and/or a noise level corresponding to said result of said combining based on said despread at least a portion of said result of said combining.

7. The method according to claim 1, comprising despreading at least a portion of said result of equalization processing, and computing said one or both of a signal level and/or a noise level corresponding to said result of said equalization processing based on said despread at least a portion of said result of said equalization processing.

8. The method according to claim 7, comprising comparing said computed one or both of a signal level and/or a noise level corresponding to said result of equalization processing and a computed said one or both of a signal level and/or a noise level corresponding to said result of said combining.

9. The method according to claim 8, wherein said selecting one of said result of said combining and said result of said equalization processing is based on said comparing said computed one or both of a signal level and/or a noise level corresponding to said result of equalization processing and said computed one or both of a signal level and/or a noise level corresponding to said result of said combining.

10. The method according to claim 9, comprising controlling equalization processing that occurs subsequent to said selecting based on one or both of said computed one or both of a signal level and/or a noise level corresponding to said result of equalization processing, and said computed one or both of a signal level and/or a noise level corresponding to said result of said combining.

11. A system for processing RF signals, the system comprising:
    one or more circuits comprising at least one cluster path processor that are operable to compute channel estimates based on at least one of a plurality of received individual distinct path signals;
    said one or more circuits comprising said at least one cluster path processor are operable to generate timing reference signals indicating a location of said at least one of said plurality of received individual distinct path signals;
    said one or more circuits comprising a maximum ratio combining processor are operable to combine at least a portion of said plurality of received individual distinct path signals as a signal cluster based on at least one of said computed channel estimates and said generated timing reference signals; and
    said one or more circuits are operable to select one or both of a result of said combining and/or a result of equalization processing, said selection is based on a comparison of estimates, said estimates comprising one or both of a signal level and/or a noise level corresponding to said result of said combining, and one or both of a signal level and/or a noise level corresponding to said result of said equalization processing.

12. The system according to claim 11, wherein said one or more circuits comprising an equalization processor are operable to process said at least one of a plurality of received individual distinct path signals to generate said result of equalization processing.

13. The system according to claim 11, wherein said one or more circuits within a mobile receiver are operable to receive each of said plurality of received individual distinct path signals at a different time instant.

14. The system according to claim 13, wherein said different time instants are determined based on said generated timing reference signals.

15. The system according to claim 11, wherein said signal cluster comprises said at least a portion of said plurality of received individual distinct path signals.

16. The system according to claim 11, wherein said one or more circuits comprising despreader circuitry are operable to despread at least a portion of said result of said combining, and to compute said one or both of a signal level and/or a noise level corresponding to said result of said combining based on said despread at least a portion of said result of said combining.

17. The system according to claim 11, wherein said one or more circuits comprising despreader circuitry are operable to despread at least a portion of said result of equalization processing, and to compute said one or both of a signal level and/or a noise level corresponding to said result of said equalization processing based on said despread at least a portion of said result of said equalization processing.

18. The method system according to claim 17, wherein said one or more circuits comprising decision control circuitry are operable to compare said computed one or both of a signal level and/or a noise level corresponding to said result of equalization processing and a computed said one or both of a signal level and/or a noise level corresponding to said result of said combining.

19. The system according to claim 18, wherein said selecting one of said result of said combining and said result of said equalization processing is based on said comparing said computed one or both of a signal level and/or a noise level corresponding to said result of equalization processing and said computed one or both of a signal level and/or a noise level corresponding to said result of said combining.

20. The system according to claim 19, wherein said decision control circuitry is operable to control equalization processing that occurs subsequent to said selecting based on one or both of said computed one or both of a signal level and/or a noise level corresponding to said result of equalization processing, and said computed one or both of a signal level and/or a noise level corresponding to said result of said combining.

21. The method according to claim 9, comprising despreading one of at least a subsequent portion of said result of said combining and at least a subsequent portion of said result of said equalization processing, based on said selecting.

22. The system according to claim 19, wherein said one or more circuits are operable to despread one of at least a subsequent portion of said result of said combining and at least a subsequent portion of said result of said equalization processing, based on said selecting.

* * * * *